(12) United States Patent
George et al.

(10) Patent No.: US 8,788,328 B1
(45) Date of Patent: Jul. 22, 2014

(54) LOCATION AFFINITY BASED CONTENT DELIVERY SYSTEMS AND METHODS

(75) Inventors: William Brandon George, Pleasant Grove, UT (US); Kevin G Smith, Lehi, UT (US)

(73) Assignee: Adobe Systems Incorporated, San Jose, CA (US)

( * ) Notice: Subject to any disclaimer, the term of this patent is extended or adjusted under 35 U.S.C. 154(b) by 338 days.

(21) Appl. No.: 13/223,205

(22) Filed: Aug. 31, 2011

(51) Int. Cl.
*G06Q 30/00* (2012.01)
*G06Q 90/00* (2006.01)
(52) U.S. Cl.
CPC ..................................... *G06Q 90/00* (2013.01)
USPC ........................................................ 705/14.1

(58) Field of Classification Search
CPC ...................................................... G06Q 90/00
USPC .......................................................... 705/14.1
See application file for complete search history.

(56) References Cited

U.S. PATENT DOCUMENTS

2008/0248815 A1* 10/2008 Busch ......................... 455/456.5

* cited by examiner

*Primary Examiner* — Daniel Lastra
(74) *Attorney, Agent, or Firm* — Kilpatrick Townsend & Stockton LLP

(57) ABSTRACT

Provided is a method for providing content. The method includes obtaining historical geographic location data indicative of one or more geographic locations visited by a user in the past, identifying a location affinity associating the user with one or more of the geographic locations visited by a user in the past, identifying affinity content corresponding to the location affinity, receiving, from a client computer system, a current request to provide content to the user, and providing, to the client computer system in response to the current request, the identified affinity content.

17 Claims, 5 Drawing Sheets

| User ID | Date | Activity Type/Description | Geographic Location |
|---|---|---|---|
| 1234 | 01/01/2011 | Visit Site 1 | Los Angeles |
| 1234 | 01/05/2011 | Visit Site 1 | New York City |
| 1234 | 01/05/2011 | Register Site 2 | New York City |
| 1234 | 03/01/2011 | Visit Site 1; $60 Purchase | New York City |
| 1234 | 04/03/2011 | Visit Site 1; $15 Purchase | Los Angeles |
| 1234 | 04/05/2011 | Visit Site 1 | New York City |
| 1234 | 05/06/2011 | Visit Site 1; $10 Purchase | New York City |
| 1234 | 06/07/2011 | Visit Site 1; $10 Purchase | Chicago |

*FIG. 3*

Condition
1) Visit Location more than three times a year.
2) Five or more visits to website while in location.
3) One or more visits to website each month while in location for at least three months in a row.
4) Registered New Account on website while in location.
5) Spent $50 or more at website while in location.
6) Spent more money at website while in location than any other location.

*FIG. 4*

Content
1) Advertisement 1
2) Advertisement 2
3) Advertisement 3
4) Advertisement 4
5) Advertisement 5
6) Advertisement 6

*FIG. 5*

LOCATION AFFINITY BASED CONTENT DELIVERY SYSTEMS AND METHODS

BACKGROUND

Goods and services providers often employ various forms of marketing to drive consumer demand for products and services. Marketing often employs various techniques to expose target audiences to content promoting brands, products, services, and so forth. For example, marketing may include providing promotional content, such as advertisements, to consumers to encourage them to purchase a product or service. Content is often delivered to an audience via television commercials, radio commercials, webpage advertisements and so forth.

In some instances, content providers will attempt to identify their audience and provide content that is specifically tailored for a target audience (e.g., targeted content). For example, a website provider will acquire demographic information of a web site visitor and provide targeted content based on the demographic information. The targeted content is delivered to the audience in hopes of improving the likelihood of the audience taking a desired course of action, often referred to as a conversion. For example, if it has been determined that a visitor has a history of visiting sports related websites, a targeted advertisement for a sports drink may be displayed on the website in hopes of the visitor being persuaded to purchase the sports drink. It is believed that targeted content improves both of the visitor's experience and the web site's overall effectiveness. Similar techniques are employed in other forms of marketing.

To provide targeted advertising, existing techniques take into account demographic information relating to a user's age, gender, and so forth to identify targeted content to be provided to the audience. The existing techniques, however, fail to consider other types of information about the user that can be helpful in tailoring content to the target audience.

Accordingly, it is desirable to provide technique for identifying and providing targeted content to audiences.

SUMMARY

Various embodiments of methods and apparatus for identifying and providing targeted content to an audience are presented. In some embodiments, a method for providing content includes obtaining historical geographic location data indicative of one or more geographic locations visited by a user in the past, identifying a location affinity associating the user with one or more of the geographic locations visited by a user in the past, identifying affinity content corresponding to the location affinity, receiving, from a client computer system, a current request to provide content to the user, and providing, to the client computer system in response to the current request, the identified affinity content.

In some embodiments, a non-transitory computer readable storage medium stores computer-executable program instructions that when executed by a computer are configured to cause obtaining historical geographic location data indicative of one or more geographic locations visited by a user in the past, identifying a location affinity associating the user with one or more of the geographic locations visited by a user in the past, identifying affinity content corresponding to the location affinity, receiving a current request to provide content to the user, and providing, in response to the current request, the identified affinity content.

In some embodiments, provided is a content delivery system including a processor and a memory storing a location affinity processing module executable by the processor to obtain historical geographic location data indicative of one or more geographic locations visited by a user in the past, identify a location affinity associating the user with one or more of the geographic locations visited by a user in the past, identify affinity content corresponding to the location affinity, receive a current request to provide content to the user, and provide, in response to the current request, the identified affinity content.

BRIEF DESCRIPTION OF THE DRAWINGS

FIG. 3 is a table that illustrates accumulated location data in accordance with one or more embodiments of the present technique.

FIG. 4 is a table that depicts an exemplary set of location affinity rules in accordance with one or more embodiments of the present technique.

FIG. 5 is a table that depicts an exemplary set of affinity content rules, in accordance with one or more embodiments of the present technique.

Figure 1:
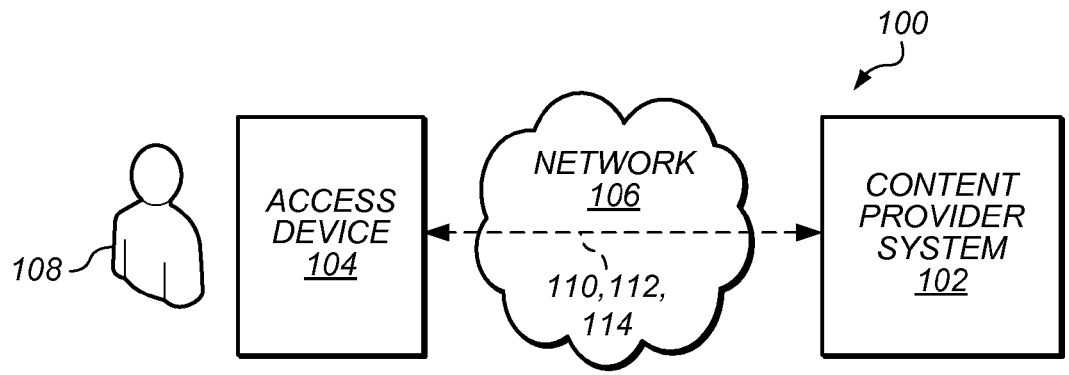
FIG. 1 is a diagram that illustrates an exemplary content system in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, provided in some embodiments are systems and methods for providing targeted content to audiences, including one or more users. In some embodiments, the targeted content to be provided to a user is location-based. In certain embodiments, targeted content is selected/provided based on geographic locations visited by the user in the past (e.g., historical travel patterns of the user). In some embodiments, geographic locations (e.g., cities) visited by a user are tracked and used as a basis for identifying targeted content to be provided to the user. In certain embodiments, the geographic locations of the user are determined based on location data provided when a user interacts with a content site (e.g., location data transmitted at the time of a user visiting a website). In some embodiments, the location data is acquired over a given period to generate a listing of various geographical locations visited by the user (e.g., historical travel patterns of the user). In certain embodiments, the various geographical locations visited by the user are processed to determine whether or not the user has a relationship (e.g., affinity) with one or more locations (e.g., whether the user visits the location on a regular basis). In some embodiments, an affinity is identified by comparing the geographic locations visited by the user and/or corresponding user activity to predefined rules (e.g., affinity rules). In certain embodiments, if it is determined that the user has an affinity with a given geographic location (e.g., a geographic location affinity), the user is provided with content that corresponds to the affinity, thereby providing content based on the locations previously visited by the user. In certain embodiments, if it is determined that the user does not have an affinity with a geographic location, the user is provided with default/generic content that does not necessarily correspond to any particular geographic location. In some embodiments, the content to be provided to the user is identified based on content rules (e.g., affinity content rules) that correlate particular content to outcomes of the application of the affinity rules. In certain embodiments, for example, where the user has made several visits to a website while in New York City, the location data may be assessed to identify that the user has a location affinity with New York City and, thus, when visiting the website, the user may be provided with content corresponding to New York City, even when the user access the website from a location that is remote from New York City, such as Los Angeles. Accordingly, targeted content provided during a user's interaction with a site may be based on a user's affinity with a location, and may not be based on the user's current location at the time of the interaction with the site.

FIG. 1 is a diagram that illustrates an exemplary content system 100 in accordance with one or more embodiments of the present technique. System 100 may be employed to acquire user location data, determine geographic locations visited by users based on the location data, determine whether or not a particular user has an affinity with a given geographic location based at least on the determined geographic locations, identify targeted content to be provided to the user based on the existence or non-existence of an affinity, and/or provide the targeted content to the user. In the illustrated embodiment, system 100 includes a content provider system 102 and an access device 104 communicatively coupled to one another via a network 106.

Access device 104 may include a computer or similar device employed by a user 108 to interact with devices at various locations on network 104. For example, device 104 may include a personal computer, a cellular phone, a personal digital assistant (PDA), or the like. In some embodiments, access device 104 includes a remote access device, such as a wireless communications device. For example, device 104 may include a cellular phone connected to network 106 via a cellular network. Use of a remote access device may enable user 108 to access network 106, and entities connected thereto (e.g., content provider system 102), from a variety of locations remote geographic locations.

Network 106 may include a communications channel for providing effective data exchange between various entities of system 100. In some embodiments, network 106 includes an electronic communication network, such as the internet, a local area network (LAN), a cellular communications network, or the like. Network 106 may include one or more networks that facilitate communication between the entities of system 100. For example, network 106 may include a cellular network coupled to a local area network of content provider system 102 via the internet.

In some embodiments, device 104 may include an application (e.g., user selected/installed mobile application) that can be used to generate a request for content, to provide content, to render content, and/or to exchange requests with various devices on network 106. For example, device 104 may include an internet web-browser or similar application that can be used to transmit/receive data/content 110 via network 106, render data/content 110 on device 104, and/or enable user interaction with content 110 and/or content provider system 102. Device 104 may include an onboard application that records and/or transmits location data 112 such that whereabouts of user 108 (e.g., geographic locations visited by user 108) may be tracked. In some embodiments, location data 112 may be accompanied by, or otherwise include additional information regarding user activity at a given geographic location. For example, location data may include an indication of a geographic location of user 108 and/or access device 104 (e.g., zip code, geographic coordinates, IP address, or the like) at the time of an activity (e.g., user 108 visits a website using access device 104), a user identifier, a time/date of the activity, a type/description of the activity, and so forth.

Device 104 may exchange location data 112 with content provider system 102. For example, access device 104 may transmit location data 112 to content provider system 102 via network 106. In some embodiments, location data 112 is transmitted directly from access device 104 to content provider system 102. For example, access device 104 may include an integrated GPS device that is capable of providing geographical coordinates (e.g., latitude and longitude) indicative of a geographic location of access device 104 and/or user 108. In some embodiments, location data 112 may be obtained via a source external to access device 104. For example, where access device 104 includes a cellular phone, a proxy server for the corresponding cellular network may generate and/or forward location data 112 to content provider system 102.

Location data 112 may be transmitted to content provider system 102 in response to receiving a user request to access content 110 and/or rendering/executing of content 110 (e.g., a webpage) at device 104. In some embodiments, where a user engages in activity via device 104 (e.g., user 108 visits a website using access device 104), location data 112 may include an indication of a geographic location of user 108 and/or access device 104 at the time of the activity, a user identifier associated with the activity, a time/date of the activity, a type/description of the activity, and so forth. In some embodiments, device 104 may include an application that transmits analytics data to a collection server. For example, device 104 may include an application that transmits location data 112 to an analytics server, database, or the like of content provider system 102. Interactions with an analytics provider and an analytics server are described in more detail below with regard to at least FIG. 6.

Content provider system 102 may include an entity that provides content to various entities and users of system 100. In some embodiments, content provider system 102 host a content site, such as a website, a file transfer protocol (FTP) site, or other source of content accessible via network 106. For example, content provider system 102 may include one or more web servers having webpages of a website stored thereon. Content provider system 102 may provide content 110 in response to receiving a corresponding request/query 114. For example, in response to receiving, from access device 104, a request 114 for a web page initiated by user 108, content provider system 102 may transmit, via network 106, content 110 that includes a corresponding HTML file for the webpage requests. The HTML file may be rendered for display to user 108 on an electronic display of device 104. Where content provider system 102 includes an analytics system, as a result of rendering or otherwise accessing content 110, corresponding analytics data may be transmitted to content provider system 102 as described in more detail below with regard to at least FIG. 6. For example, rendering of the webpage may cause execution of embedded web-bug code that causes transmission of analytics data to an analytics sever of content provider system 102. In some embodiments, analytics data includes location data 112 including an indication of a geographic location of user 108 and/or access device 104 at the time of an activity (e.g., user 108 visits a website using access device 104), a user identifier, a time/date of the activity, a type/description of the activity, and so forth.

Content provider system 102 may provide for the accumulation and/or processing of location data received. For example, content provider system 102 may store location data 112 in a database. In some embodiments, raw location data 112 received from access device 104 may be stored by content provider system 102. For example, raw analytics data may be stored in a database or other memory. In some embodiments, raw location data 112 may include an indication of location that is subsequently processed to determine a geographic location of the user. For example, raw location data may include a geographic coordinates, a zip code, and IP address or the like that are processed to identify geographic location of interest for identifying a location affinity. In some embodiments, the raw location data is processed (e.g., parsed) to identify a particular geographic location of user 108 and/or access device 104 at or near the time of an activity (e.g., user 108 visits a website using access device 104), a user identifier associated with the activity, a time/date of the activity, a type/description of the activity, and so forth. For example, the raw location data (e.g., geographic coordinates) may be processed to identify a corresponding continent, country, state, county, city, zip code, address, or the like that is of interest in identifying a location affinity. The processed data may be stored in a database or other memory. In some embodiments, location data 112 is acquired over time to generate accumulated location data, as discussed below with regard to at least FIGS. 2 and 7.

Figure 2:
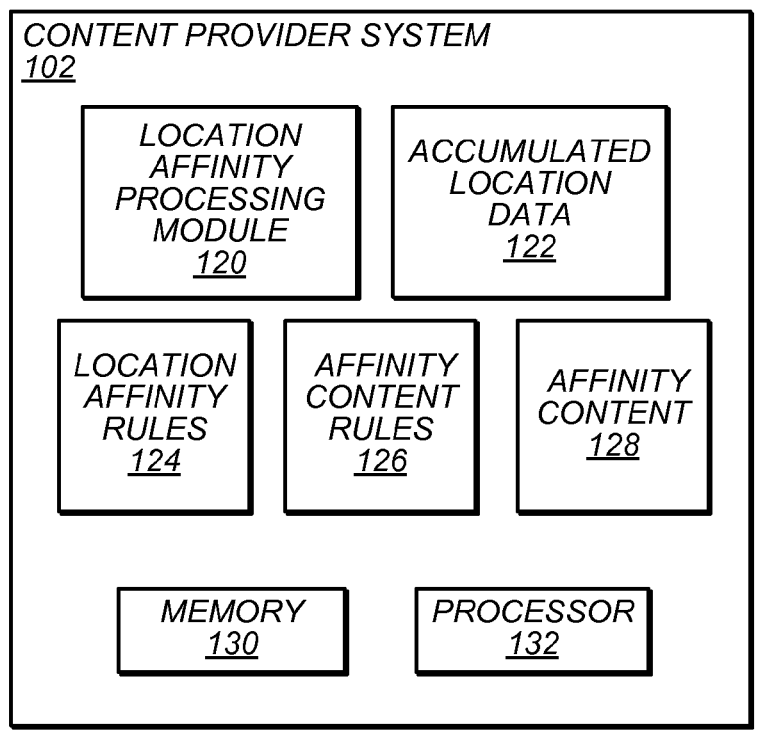
FIG. 2 is a diagram that illustrates an exemplary content provider system in accordance with one or more embodiments of the present technique.
Figure 7:
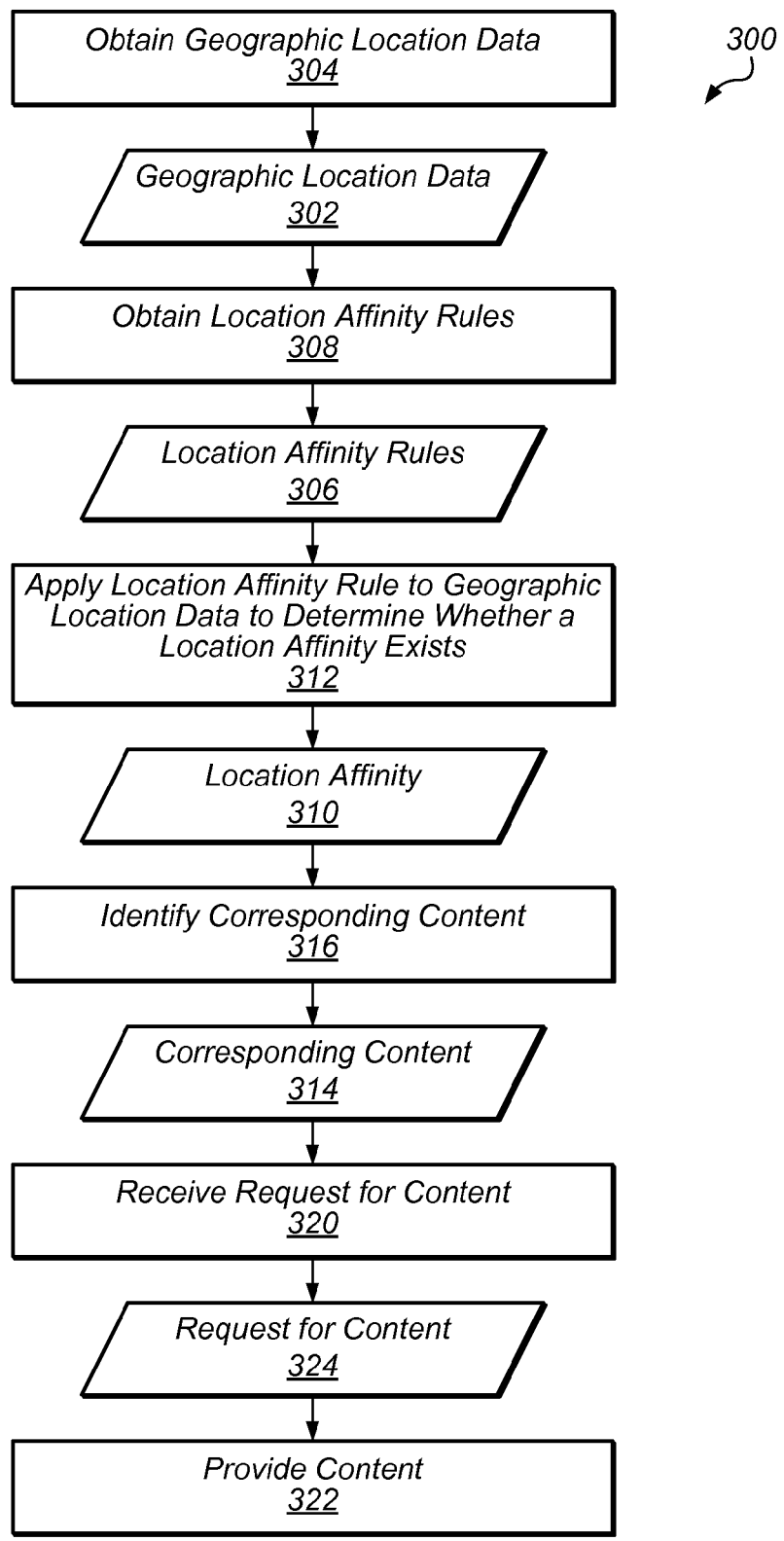
FIG. 7 is a flowchart that illustrates a method of providing content in accordance with one or more embodiments of the present technique.

An affinity processing module of content provider system 102 may process location data 112 to determine geographic locations visited by users based on the location data, determine whether or not a particular user has an affinity with a given geographic location based at least on the determined geographic locations, identify targeted content to be provided to the user based on the existence or non-existence of an affinity, and/or provide the targeted content to the user, as discussed below with regard to at least FIGS. 2 and 7.

Figure 8:
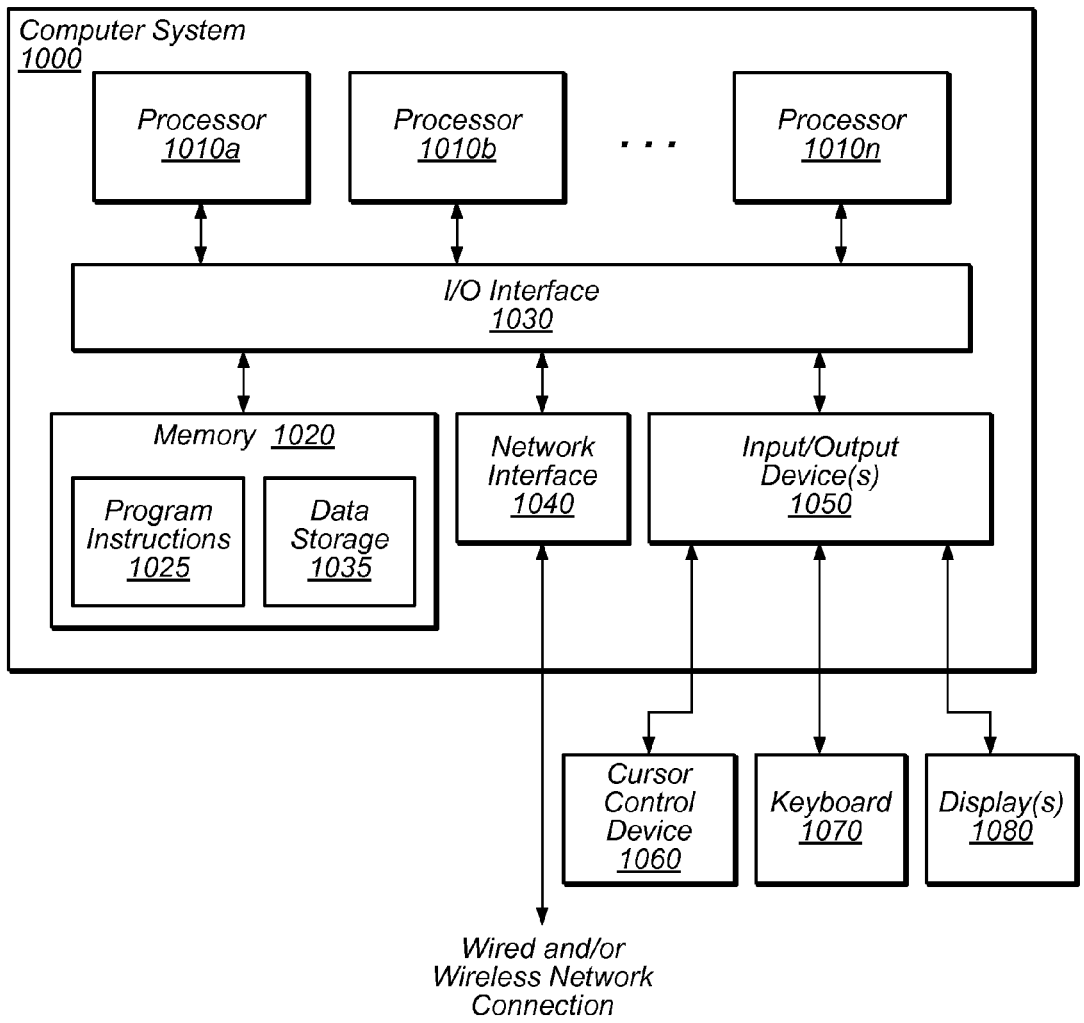
FIG. 8 is a diagram that illustrates an exemplary computer system in accordance with one or more embodiments of the present technique.

FIG. 2 is a diagram that illustrates content provider system 102 in accordance with one or more embodiments of the present technique. In the illustrated embodiment, content provider system 102 includes a location affinity processing module 120, accumulated location data 122, location affinity rules 124, affinity content rules 126, affinity content 128, memory 130 and processor 132. Module 102 may process accumulated location data 112 and/or location data 122 to determine geographic locations visited by a user based on the location data, determine whether or not the user has an affinity with a given geographic location based at least on the determined geographic locations, identify targeted content to be provided to the user based on the existence or non-existence of an affinity, and/or provide the targeted content to the user. Memory 130 may be the same or similar to system memory 1020 described below with regard to at least FIG. 8. Processor 132 may be the same or similar to processor 1010 described below with regard to at least FIG. 8.

In some embodiments, accumulated location data 122 may include an accumulation of location data 112 received by content provider system 102. For example, each time a device (e.g., access device 104) transmits location data to content provider system 102, content provider system 102 may store the location data (e.g., in memory 130) to generate a database of accumulated location data 122. In some embodiments, at least partially processed location data may be stored to generate accumulated location data 122. For example, raw analytics data may be processed (e.g., parsed) by location affinity processing module 120 to identify a geographic location of user 108 and/or access device 104 at the time of an activity (e.g., user 108 visits a website using access device 104), a user identifier associated with the activity, a time/date of the activity, a type/description of the activity, and so forth. The processed data may be stored to generate accumulated location data 122.

In some embodiments, accumulated location data 122 may include location data corresponding to activities of one or more users over a period time. For example, accumulated location data 122 may include, for one or more websites, location data 112 collected for every website visit by every visitor to the one or more websites in a given time period (e.g., the past year), such that accumulated location data 122 includes a historical database having an entry corresponding to each website visit by every website visitor over the time period. In some embodiment, each entry includes location data that can be used to ascertain the location of a user and/or access device associated with the activity at the time of the activity, such that accumulated location data 122 can be processed to determine geographical locations visited by users over a given period of time. For example, where entries associated with users each correspond to a particular visit to a website by a user and include location data (e.g., a geographical coordinate of user 108 and/or access device 104 at the time of the user visiting the one or more websites), accumulated location data 122 can be processed to determine travel patterns of one or more user over the given time period. Where each entry includes an identifier that is unique to the associated user, accumulated location data 122 can be filtered by a particular user identifier to readily identify locations visited by a particular user associated with the particular user identifier, and, thus, identify travel patterns of the particular visitor over the given time period.

In some embodiments, location data is associated with a specific activity, such as a content request. In other embodiments, however, accumulated location data 122 is gathered on a periodic or continuous basis, without regard to activity by the user. For example, a user's mobile device may have an application that periodically or frequently or continuously reports location information to a server. In some embodiments, accumulated location data 122 is received from a service that aggregates location data from a regular broadcast by access device 104 of a location of user 108 on a recurring or continuous basis. In such embodiments, accumulated location data 122 provides a more continuous picture of location information than is provided from data generated when the user visits a specific company's site or application. As an example, user 108 could visit New York City, and while user 108 did not access a particular vendor's website while in New York, N.Y. could be logged as a visited location to be used in location affinity processing (due to the fact that the location associated with user 108 is broadcast at regular intervals by device 104).

FIG. 3 is a table 150 that illustrates accumulated location data 122 in accordance with one or more embodiments of the present technique. Table 150 includes accumulated location data 122 associated with a user ("1234"). Accumulated location data 122 may include entries that are based upon location data 112 received over a given period of time. For example, in the illustrated embodiment, accumulated location data 122 may have been formed based on at least eight strings of location data 112 that were previously received during the year 2011. Each of the received strings of may have been parsed to extract the user identifier, a date of the activity, a type/description of the activity, and the geographic location. For example, incoming strings of analytics data generated by device 104 in response to each of the respective activities may have been parsed by module 102 to extract and store the data for each respective entry. Although the illustrated embodiment includes accumulated location data 122 associated with a single user (e.g., user associated with identifier "1234"), other embodiments, may include any number of entries for any number of users. For example, accumulated location data 122 may include entries associated with a plurality of different user identifiers, and the illustrated table 150 may simply reflect results of filtering the accumulated location data by user ID "1234".

In the illustrated embodiment, location data 104 includes a plurality of entries 151 (e.g., rows) that each include a geographic locations visited by the user. Each of the entries includes a user identifier (ID) 152, a date 154, an activity type/description 156, and a geographic location 158. Identifier 152 may include a unique user identifier, such that entries associated with a given user can be readily identified from entries associated with other identifiers (e.g., different users). In the illustrated embodiment, all of the entries are associated with a particular user ID "1234". For each of the entries, date 154 may provide an indication of when the user when the activity corresponding to particular entry took place and, thus, a geographic location where the user was located at or near the time when the activity took place. In the illustrated embodiment, the date includes the month, day and year. Other embodiments may include other indications of time, such as time of day, day of the week, and so forth. For each of the entries, activity type/description 156 may provide an indication of a type of activity associated with the particular entry or other details relating to the activity. In the illustrated embodiment, the activity type/description identifies whether the entry corresponds to a site visit, a site registration, a purchase via the site, and an amount of the purchase. Other embodiments may include other information, such as whether the user added items to a cart, a site visitation path taken by the user during a corresponding website visit, and so forth. For each of the entries, geographic location 158 designates a city. The geographic location may be a physical place (e.g., city) where the user associated with the identifier for the entry is determined to be, at or near the time of engaging in the given activity at the given date. Other embodiments may include other indications of geographic location, such as a continent, country, state, county, zip code, address, or the like. While references have been made to geographic location 158 as designating a city, one of skill in the art will realize in light of having read the present disclosure that geographic location 158 in some embodiments includes the use of more granular geographic coordinates (e.g., latitude and longitude in degrees, minutes and seconds) as well as the designation of specific points of interest (e.g., a particular retail establishment designated by its address) without departing from the scope of the embodiments presented herein. Such granular geographic coordinates may be used to provide specific advertisements tailored to a particular location (e.g., an advertisement for a coffee shop may be shown to a user recorded to have walked by or visited the coffee shop on a recurring basis) without departing from the scope of the embodiments disclosed herein.

As illustrated by table 150 and accumulated location data 122, a user's activities and locations may be tracked over a given period of time such that location data 122 includes historical geographic location data indicative of one or more geographic locations determined to have been visited by the user in the past. For example, table 150 includes location information spanning at least the time frame of Jan. 1, 2011 to Jun. 7, 2011, for the particular user associated with user ID "1234". Based on accumulated location data 122 of table 200, it can be determined that the user has visited at least the cities of Los Angeles, N.Y. and Chicago during the time frame of Jan. 1, 2011 to Jun. 7, 2011.

FIG. 4 is a table 170 that depicts an exemplary set of location affinity rules 126 in accordance with one or more embodiments of the present technique. In the illustrated embodiment, table 170 includes seven rules 126 to be considered when evaluating whether or not a location affinity exists between a user and a given geographic location. Affinity rules 126 may be applied to location data, such as accumulated location data 122 provided in table 150, to determine whether or not an affinity exists between a user and a geographic location. In some embodiments, an affinity may be determined to exist if at least one of the rules is satisfied. For example, applying the first rule, "Visit Location more than three times a year" and the accumulated location data 122 of table 150, it can be determined that the user associated with user ID "1234" has an affinity with the geographic location of "New York City" based at least on the five identified visits to New York City. The other rules of table 150 may be applied to determine whether or not any other location affinities exist.

FIG. 5 is a table 180 that depicts an exemplary set of affinity content rules 128, in accordance with one or more embodiments of the present technique. In the illustrated embodiment, table 180 includes seven rules 128 dictating which of different types of content (e.g., seven different advertisements) is to be provided to the user based on which, if any, of the affinity rules 126 are satisfied. In some embodiments, each of the identified content (e.g., Advertisements 1-7) corresponds to a respective one of the affinity rules (e.g., affinity rules 1-7) 126. Upon determining that an affinity rule 126 is satisfied and, thus, a corresponding location affinity exists, content rules 128 may specify that particular content (e.g., a particular advertisement) is to be provided to the user. For example, upon determining that the first rule ("Visit Location more than three times a year") is satisfied, the corresponding first content rule may specify that the first advertisement (e.g., "Advertisement 1") is to be provided to the user. In the illustrated embodiment, each of the identified contents is different (e.g., each of the rules designate a different advertisement). In some embodiments, two or more of the identified contents may be same. For example, content associated with affinity rules one and three may both include "Advertisement 1" such that the user is provided "Advertisement 1" in response to a determination that the first condition ("Visit Location more than three times a year") or the third condition ("One or more visits to website each month while in location for at least three months in a row") have been satisfied.

In some embodiments, when identifying user patterns of location affinity, affinity content rules 128 may specify the use of the time of at which a user visits a location as a criterion for establishing that a certain advertisement or content should be provided. For example, if a user has an affinity with New York City, and the pattern has been recognized that the user visits New York City on a particular day or week of every month, then at a configurable period (e.g. 3 days) before the user is expected to leave on a next trip to New York City, the user could be served an New York City—specific advertisement.

Affinity content 128 may include content that is to be provided to a user based on an identified location affinity. For example, affinity content 128 may include advertisements "1-7", designated by affinity content rules 126. In some embodiments, affinity content 128 may include default content to be displayed in the instance that none of the affinity rules are satisfied and, thus, it is determined that no location affinity exists. For example, affinity content 128 may include default/generic "Advertisement 0" that is different from the advertisements "1-7".

Location affinity rules 124, affinity content rules 126, affinity content 128 and/or affinity processing module 120 may be stored on a memory 130 of system 102. In some embodiments, location data 104, location affinity rules 106, affinity content and/or module may be processed/executed using processor 132. For example, processor 132 may execute various functions of location affinity processing module 120 to determine geographic locations visited by a user based on the location data, determine whether or not the user has an affinity with a given geographic location based at least on the determined geographic locations, identify targeted content to be provided to the user based on the existence or non-existence of an affinity, and/or provide the targeted content to the user.

Figure 6:
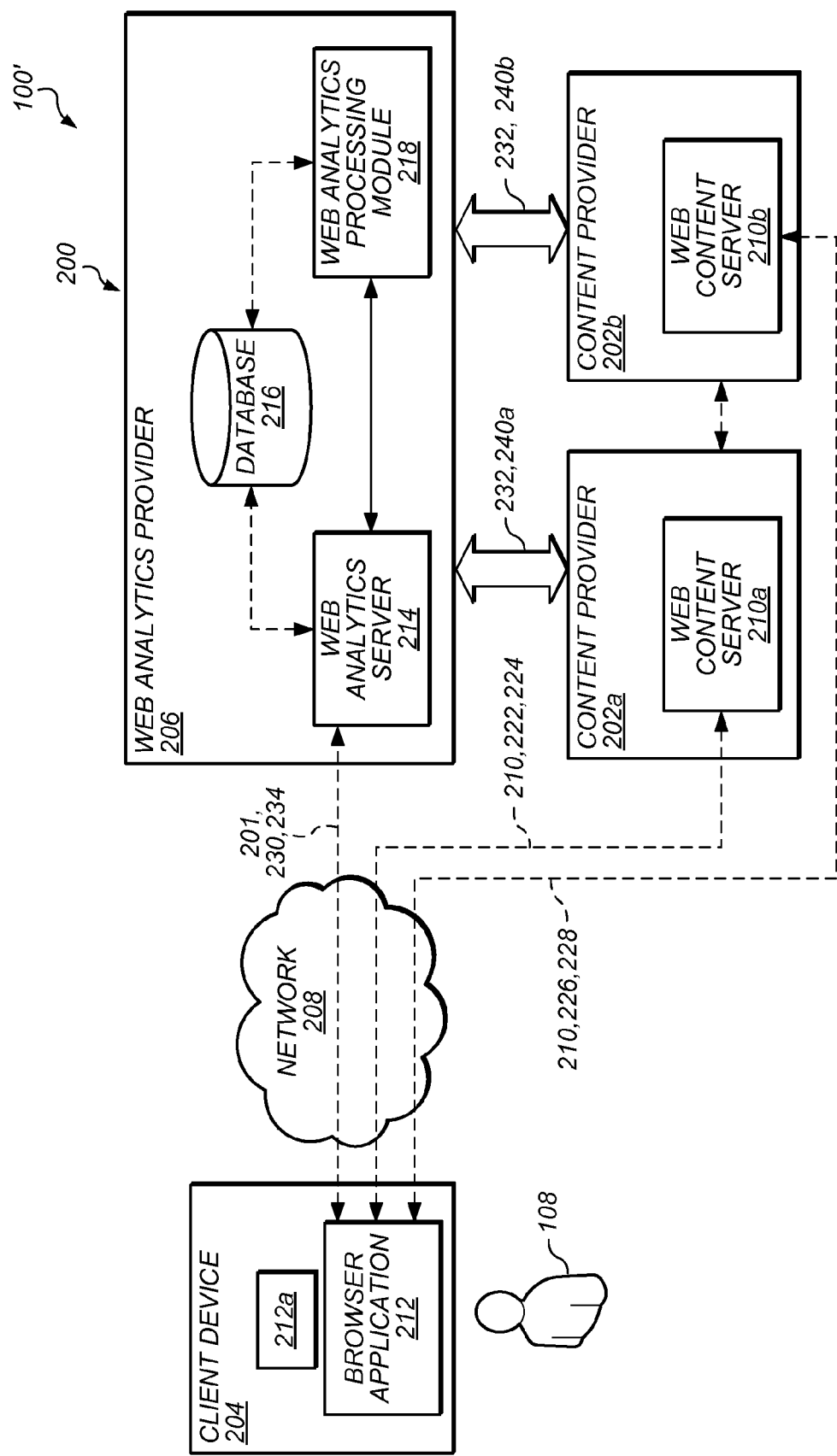
FIG. 6 is a diagram that illustrates an exemplary content system, including a web analytics system, in accordance with one or more embodiments of the present technique.

FIG. 6 is a diagram that illustrates an exemplary content system 100', including a web analytics system 200, in accordance with one or more embodiments of the present technique. System 100' may be employed to acquire and/or process analytics data. In some embodiments, analytics data may include location data 112 that is used generate accumulated location data 122. In the illustrated embodiment, system 200 includes content providers 202a and 202b, a client device 204 and a web analytics provider 206.

Each of content providers 202a and 202b, client device 204 and web analytics provider 206 may be communicatively coupled to one another via a network 208. In some embodiments, web analytics system 200, including web analytics provider 206 content providers 202a and/or content provider 202b may be the same or similar to (e.g., provided as a portion of content provider system 102). In some embodiments, client device 204 may be the same or similar to access device 104. In some embodiments, network 208 may be the same or similar to network 106.

During use, user 108 may employ client device 204 to retrieve content from content providers 202a and/or 202b via network 208. Client device 204 may transmit corresponding analytics data 201 to web analytics provider 206 via network 208. Web analytics provider 206 may employ a location affinity processing module to determine geographic locations visited by a user based on analytics/location data, determine whether or not the user has an affinity with a given geographic location based at least on the determined geographic locations, identify targeted content to be provided to the user based on the existence or non-existence of an affinity, and/or provide the targeted content to the user. For example, a location affinity processing module (e.g., web analytics processing module 218) may process received analytics data 201, extract location data 112 from the analytics data 201, determine geographic locations visited by user 108 based on location data 112, determine whether or not the user has an affinity with a given geographic location based at least on the determined geographic locations, identify targeted content to be provided to the user based on the existence or non-existence of an affinity, and employ at least one of content providers 202a or 202b to provide the targeted content to client device 204, such that the targeted content can be provided to user 108.

Content providers 202a and/or 202b may include source of information/content (e.g., an HTML file defining display information for a webpage) that is provided to client device 204. For example content providers 202a and/or 202b may include vendor websites used to present retail merchandise to a consumer. In some embodiments, content providers 202a and 202b may include respective web content servers 210a and 210b. Web content servers 210a and 210b may include web content 210 stored thereon, such as HTML files that are accessed and loaded by client device 204 for viewing webpages of content providers 202a and 202b. In some embodiments, content providers 202a and 202b may serve client 204 directly. For example, content 210 may be provided from each of servers 210a or 210b directly to client 204. In some embodiments, one of content providers 202a and 202b may act as a proxy for the other of content providers 202a and 202b. For example, server 210a may relay content 210 from server 210b to client device 204.

Client device 204 may include a computer or similar device used to interact with content providers 202a and 202b. In some embodiments, client device 204 includes a wireless device employed by user 108 to access content 210 (e.g., web pages of a websites) from content providers 202a and 202b via network 208. For example, client device 204 may include a personal computer, a cellular phone, a personal digital assistant (PDA), or the like. In some embodiments, client device 204 may include an application (e.g., internet web-browser application) 212 that can be used to generate a request for content, to render content, and/or to communicate request to various devices on the network. For example, upon selection of a website link on a webpage displayed to the user by browser application 212, browser application 212 may submit a request for the corresponding webpage/content to web content server 210a, and web content server 210a may provide corresponding content 210, including an HTML file, that is executed by browser application 212 to render the requested website for display to the user. In some instances, execution of the HTML file may cause browser application 212 to generate additional request for additional content (e.g., an image referenced in the HTML file as discussed below) from a remote location, such as content providers 202a and 202b and/or web analytics provider 206. The resulting webpage 212a may be viewed by a user via a video monitor or similar graphical presentation device of client device 204.

Web analytics provider 206 may include a system for the collection and processing of web analytics data 201, and the generation of corresponding web analytics reports including various metrics of the web analytics data (e.g., a promotion effectiveness index and/or a promotion effectiveness ranking). Web analytics data 201 may include data that describes usage and visitation patterns for websites and/or individual webpages within the website. Web analytics data 201 may include information relating to the activity and interactions of one or more users with a given website or webpage. For example, web analytics data 201 may include historic and/or current website browsing information for one or more website visitors, including, but not limited to identification of links selected, identification of web pages viewed, identification of conversions (e.g., desired actions taken—such as the purchase of an item), number of purchases, value of purchases, and other data that may help gauge user interactions with webpages/websites.

In some embodiments, analytics data 201 includes location data 112. Analytics data 201 may include an indication of a geographic location of user 108 and/or access device 104 at the time of an activity (e.g., user 108 visits a website using access device 104), a user identifier, a time/date of the activity, a type/description of the activity, and so forth. In some embodiments, web analytics data 201 can be used to assess a user's activity and the corresponding geographic location of the user during the activities.

In some embodiments, web analytics data 201 is accumulated over time to generate a set of web-analytics data (e.g., a web analytics dataset) that is representative of activity and interactions of one or more users with a given website or webpage. For example, a web analytics dataset may include analytics data associated with all user visits to a given website. The set of web-analytics data may include, or otherwise be used to generate, accumulated location data 122.

Web analytics provider 206 may include a third-party website traffic statistic service. Web analytics provider 206 may include an entity that is physically separate from content providers 202a and 202b. Web analytics provider 206 may reside on a different network location from content providers 202a and 202b and/or client device 204. In the illustrated embodiment, for example, web analytics provider 206 is communicatively coupled to client 204 via network 208. Web analytics provider 206 may be communicatively coupled to content providers 202a and 202b via network 208. Web analytics provider 206 may receive web analytics data 201 from client device 204 via network 208 and may provide corresponding web analytics data (e.g., web analytics reports) to content provider 202a and 202b via network 208 or some other form of communication.

In the illustrated embodiment, web analytics provider 206 includes a web analytics server 214, a web analytics database 216, and a web analytics processing module 218. Processing module 218 may include computer executable code (e.g., executable software modules) stored on a computer readable storage medium that is executable by a computer to provide associated processing. For example, processing module 218 may process web analytics datasets stored in database 216 to generate corresponding web analytics reports that are provided to content providers 202a and 202b. Web analytics processing module 218 may include location affinity processing module 120.

Web analytics server 214 may service requests from one or more clients. For example, upon loading/rendering of a webpage 212a by browser 212 of client device 204, browser 212 may generate a request to web analytics server 214 via network 208. Web analytics server 214 and/or processing module 218 may process the request and return appropriate content (e.g., an image) 210 to browser 212 of client device 204. In some embodiments, the request includes a request for an image, and web analytics provider 206 simply returns a single transparent pixel for display by browser 212 of client device 204, thereby fulfilling the request. The request itself may also include web analytics data embedded therein. Some embodiments may include content provider 202a and/or 202b embedding or otherwise providing a pointer to a resource, known as a "web bug", within the HTML code of the webpage 212a provided to client device 204. The resource may be invisible in to the user 108, such as a transparent one-pixel image for display in a web page. The pointer may direct browser 212 of client device 204 to request the resource from web analytics server 214. Web analytics server 214 may record the request and any additional information associated with the request (e.g., the date and time, and/or identifying information that may be encoded in the resource request).

In some embodiments, an image request embedded in the HTML code of the webpage may include codes/strings that are indicative of web analytics data, such as data about a user/client, the user's computer, the content of the webpage, or any other web analytics data that is accessible and of interest. A request for an image may include, for example, "image.gif/XXX . . . " wherein the string "XXX . . . " is indicative of the web analytics data 201. For example, the string "XXX" may include information regarding user interaction with a website (e.g., location data 112). Web analytics provider 206 may parse the request (e.g., at server 214 or processing module 218) to extract the web analytics data contained within the request. Web analytics data 201 may be stored in web analytics database 216, or a similar storage/memory device, in association with other accumulated web analytics data. In some embodiments, processing module 218 may receive/retrieve web analytics data from web analytics server 214 and/or database 216. Web analytics processing module 218 may process the web analytics data to generate one or more web analytics reports. For example, web analytics report module 214 may filter the raw web analytics data received at web analytics server 214 to generate concise and complete web analytics reports, as may be requested by a website administrator of one of content providers 202a and 202b. Reports, for example, may include overviews and statistical analyses describing the relative frequency with which various site paths are being followed through the content provider's website, the rate of converting a website visit to a purchase (e.g., conversion), an effectiveness of various promotions, user-location affinities and so forth.

In some embodiments, user 108 interacts with client device 204 to execute a software application, such as browser application 212, for accessing and displaying one or more webpages 212a. In response to a user command, such as clicking on a link or typing in a uniform resource locator (URL), browser application 212 may issue a webpage request 222 to web content server 210a of content provider 202a via network 208 (e.g., via the Internet). In response to request 222, web content server 210a may transmit the corresponding content 210 (e.g., webpage HTML code 224 corresponding to webpage 212a) to browser application 212. Browser application 212 may interpret the received webpage code 224 to display the requested webpage 212a to user 108 at a user interface (e.g., monitor) of client device 204. Browser application 212 may generate additional requests for content from the servers, or other remote network locations, as needed. For example, if webpage code 224 calls for content, such as an advertisement, to be provided by content provider 202b, browser application 212 may issue an additional request 226 to web content server 210b. Web content server 210b may provide a corresponding response 228 containing requested content 210, thereby fulfilling the request. Browser application 212 may assemble the additional content for display within webpage 212a.

In some embodiments, client device 204 also transmits webpage visitation tracking information to web analytics provider 206. For example, as described above, webpage code 224 may include executable code (e.g., a web bug) to initiate a request for data from web analytics server 214 such that execution of webpage code 224 at browser 212 causes browser 212 to generate a corresponding request (e.g., a web-beacon request) 230 for the data to web analytics server 214. In some embodiments, request 230 may itself have web analytics data (e.g., web analytics data 201) contained/embedded therein, or otherwise associated therewith, such that transmitting request 230 causes transmission of web analytics data from client device 204 to web analytics provider 206. For example, as described above, request 230 may include an image request having an embedded string of data therein.

Web analytics provider 206 may process (e.g., parse) request 230 to extract web analytics data 201 contained in, or associated with, request 230. In some embodiments, request 230 from client device 204 may be forwarded from server 214 to database 216 for storage and/or to web analytics processing module 218 for processing. Web analytics processing module 218 and/or server 214 may process the received request to extract web analytics data 201 from request 230. Where request 230 includes a request for an image, web analytics server 214 may simply return content/image 234 (e.g., a single transparent pixel) to browser 212, thereby fulfilling request 228. In some embodiments, web analytics server 206 may transmit web analytics data and/or a corresponding web analytics reports to content providers 202a and/or 202b, or other interested entities. For example, web analytics data 201 and/or 232 and/or web analytics reports 240a and 240b (e.g., including processed web analytics data) may be forwarded to site administrators of content providers 202a and 202b via network 208, or other forms of communication. In some embodiments, a content provider may log-in to a website, or other network based application, hosted by web analytics provider 206, and may interact with the website/application to generate custom web analytics reports. For example, content provider 202a may log into a web analytics website via website server 214, and may interactively submit request 242 to generate reports for various metrics (e.g., number of conversions for male users that visit the home page of the content provider's website, an effectiveness of a promotion, etc.), and web analytics provider 206 may return corresponding reports (e.g., reports dynamically generated via corresponding queries for data stored in database 216 and processing of the data via module 218). In some embodiments, content providers 202a and 202b may provide web analytics data 201 to web analytics provider 206.

In some embodiments, web analytics provider 206 may provide data that enables content providers 202a and/or 202b to provide targeted content to user. For example, web analytics processing module 218 may process accumulated location data (e.g., received analytics data 201) to determine geographic locations visited by user 108, determine whether or not the user has an affinity with a given geographic location based at least on the determined geographic locations, identify targeted content to be provided to the user based on the existence or non-existence of an affinity, and direct at least one of content providers 202a or 202b to provide the identified targeted content to client device 204. In some embodiments, the targeted content is stored at the content provider. For example, affinity content 128 may be stored at web content serve 210a and/or 210b, and may be provided to client 204 from content providers 202a and/or 202b. In some embodiments, web analytics provider 106 may provide the targeted content to the content provider. For example, affinity content 128 may be stored in database 216, and may be forwarded to client 204 via content providers 202a and/or 202b.

FIG. 7 is a flowchart that illustrates a method 300 of providing content in accordance with one or more embodiments of the present technique. Method 300 generally includes obtaining geographic location data and location affinity rules, applying the location affinity rules to the geographic location data to determine whether a location affinity exists, identifying corresponding content, receiving a request for content and providing content. Some or all of method 300 may be implemented by location affinity processing module 102.

Method 300 may include obtaining geographic location data 302, as depicted at block 304. Obtaining geographic location data may include receiving or otherwise acquiring historical geographic location data indicative of one or more geographic locations visited by a user in the past. Geographic location data may include data that is indicative of a geographical location that has been determined to have been visited by a user. For example, geographic location data may identify a geographic location (e.g., continent, country, state, county, city, zip code, address, or the like) where the user has been in the past (e.g., a historical geographic location) or is currently located (e.g., a current geographical location). In some embodiments, geographic location data may include data from which a geographical location can be determined. For example, geographic location data may include geographic coordinates (e.g., latitude/longitude coordinates), a zip code, an IP address, physical address, a location identifier (e.g., the name of a continent, country, state, county or city) or the like. In some embodiments, geographic location data may include location data 112 and/or accumulated location data 122.

As discussed above, FIG. 3 includes a table 150 that illustrates accumulated location data 122 in accordance with one or more embodiments of the present technique. Accumulated data 122 may be indicative of an exemplary embodiment of geographic location data 302 that results from obtaining geographic location data, as depicted at block 304.

In some embodiments, obtaining geographic location data may include storing and/or retrieving geographic location data. For example, content provider system 102 may store location data 112 and/or accumulated location data in memory 130. Content provider system 102 may query a local or remote database (e.g., memory 130) for at least a portion of accumulated location data 122. In some embodiments, a query may be directed to a particular segment of the geographic location data. For example, content provider system 102 may query a local or remote database (e.g., memory 130) for the portion of accumulated location data 122 associated with user ID "1234".

In some embodiments, obtaining geographic location data may include receiving geographic location data from a source of location. In the context of content system 100 (described with regard to at least FIG. 1), receiving geographic location data may include receiving location data 112 from access device 104. For example, where access device 104 includes a cellular phone, or other mobile electronic communications device, access device 104 may transmit an indication of the geographic location of device 104 and/or user 108 to content provider system. In the context of content system 100' (described with regard to at least FIG. 6), receiving geographic location data may include receiving analytics data 201 from device 204. For example, device 204 may transmit analytics data 201 (including location data 112) to web analytics server 214 upon device 204 rendering a webpage having a web-bug embedded therein.

In some embodiments, a source of location data may transmit geographic location data at a regular interval. For example, access device 104 may transmit location data 112 to content provider system 102 every minute, hour, day, week, etc. to enable content provider system 102 to log geographic locations that have been visited by user 108. In some embodiments, a location data source may transmit geographic location data in association with user network activity. For example, access device 104 may transmit location data 112 to content provider system 102 each time user 108 accesses network 106 via device 104. In some embodiments, a location data source may transmit geographic location data in association with user interaction with a particular location on network 106. For example, access device 104 may transmit location data 112 each time user 108 accesses a particular websites on network 106 via device 104.

In some embodiments, the source of location data may include a log/batch that is indicative of a plurality of geographic locations. For example, where device 104 logs its geographic location every hour, and has not uploaded location data 112 to the content provider in the last twenty-four hours, upon establishing communication with content provider system 102, the log (including location data 112 indicative of at least twenty-four geographic locations) may be uploaded to content provider system 102. Such a technique may enable location data to provide geographic location of user 108 and/or device 104 corresponding to times when device 104 is not coupled to network 106, or is otherwise not transmitting location data 112.

In some embodiments, obtaining geographic location data may include storing location data to generate accumulated location data. For example, each time an access device transmits location data to content provider system 102, content provider system 102 may store the location data to generate a database of accumulated location data 122. In some embodiments, raw and/or at least partially processed location data 112 may be stored to generate accumulated location data 122. In some embodiments, obtaining geographic location data may include at least partially processing the location data. For example, raw analytics data may be processed (e.g., parsed) to identify a geographic location of user 108 and/or access device 104 at the time of an activity (e.g., user 108 visits a website using access device 104), a user identifier associated with the activity, a time/date of the activity, a type/description of the activity, and so forth.

Method 300 may include obtaining location affinity rules 306, as depicted at block 308. Location affinity rules may include rules that are applied to location data to determine whether or not a location affinity exists. As discussed above, FIG. 4 includes a table 170 that depicts an exemplary set of location affinity rules 126 in accordance with one or more embodiments of the present technique. In the illustrated embodiment, table 170 includes seven rules 126 to be considered when evaluating whether or not a location affinity exists between a user and a given geographic location. Affinity rules may be applied to location data, such as accumulated location data 122 provided in table 150, to determine whether or not an affinity exists between a user and a geographic location. In some embodiments, an affinity may exist if at least one of the affinity rules is satisfied. For example, applying the first rule, "Visit Location more than three times a year" and the accumulated location data 122 of table 150, it can be determined that the user associated with user ID "1234" has an affinity with the geographic location of "New York City" based at least on the five identified visits to New York City. The other rules of table 150 may be applied to determine whether or not any other location affinities exist.

In some embodiments, obtaining location affinity rules may include retrieving and/or storing the location affinity rules. For example, predefined affinity rules may be provided from a remote source and/or the affinity rules may be specified/modified by a user. The affinity rules may be stored in a local or remote database (e.g., memory 130) and content provider system 102 may query location affinity rules 126. In some embodiments, the location affinity rules may include predefined rules. In some embodiments, the predefined rules may be modified to account for variations in what constitutes an affinity. For example, an administrator may simply modify one or more of the location affinity rules to modify what constitutes a location affinity and, thus, modify what targeted content is ultimately provided to users.

Method 300 may include identifying a location affinity 310, as depicted at block 312. Identifying a location affinity may include identifying a location affinity associating the user with one or more of the geographic locations visited by a user in the past. In some embodiments, identifying location affinity for a user includes comparing location data with location affinity rules to determine whether or not an affinity exists. For example, with regard to the accumulated location data 122 of FIG. 3 and location affinity rules of FIG. 4, the geographic location, a user identifier, a time/date of the activity, and/or a type/description of the activity, and for each entry may be compared to each of the rules "1-7" to determine whether or not an affinity exists between a user associated with the user ID "1234" and a location.

Applying the first rule, "Visit Location more than three times a year" to the accumulated location data 122 of table 150, it may be determined that the user associated with user ID "1234" has a location affinity with the geographic location of New York City. For example, accumulated data 122 indicates the user having five visits to New York City between Jan. 1, 2011 and Jun. 7, 2011.

Applying the second rule, "Five or more visits to website while in location" to the accumulated location data 122 of table 150, it may be determined that the user associated with user ID "1234" does not have a location affinity with a geographic location based on the second rule. For example, although the user appears to have visited "Site 1" four times while in New York City, the user has not visited a given site five or more times while in a given location.

Applying the third rule, "One or more visits to website each month while in location for at least three months in a row" to the accumulated location data 122 of table 150, it may be determined that the user associated with user ID "1234" has a location affinity with the geographic location of New York City. For example, accumulated data 122 indicates that the user visited "Site 1" while in New York City during March, April and May of 2011.

Applying the fourth rule, "Registered New Account on website while in location" to the accumulated location data 122 of table 150, it may be determined that the user associated with user ID "1234" has a location affinity with the geographic location of New York City. For example, accumulated data 122 indicates that the user registered with "Site 2" while in New York City.

Applying the fifth rule, "Spent $50 or more at website while in location" to the accumulated location data 122 of table 150, it may be determined that the user associated with user ID "1234" has a location affinity with the geographic location of New York City. For example, accumulated data 122 indicates that the user spent a total of $70 while in New York City.

Applying the sixth rule, "Spent more money at website while in location than any other location" to the accumulated location data 122 of table 150, it may be determined that the user associated with user ID "1234" has a location affinity with the geographic location of New York City. For example, accumulated data 122 indicates that the user spent a total of $70 at "Site 1" while in New York City, as opposed to spending only $15 while in Los Angeles and $10 while in Chicago.

Thus, based on application of affinity rules 126 to accumulated location data 122, the user associated with the used ID "1234" has a location affinity 310 with New York City based on satisfying at least rules 1, 3, 4 5 and 6. Accordingly, the user associated with user ID "1234" may be provided targeted content (e.g., advertisements) corresponding to the location affinities with New York City, as discussed below.

In some embodiments, the location affinity is based on geographic locations visited by the user in the past (e.g., historical geographic locations of the user). For example, where a user takes part in activity that causes content to be served to the user, and the user is located in a geographic location (e.g., a current geographic location) at the time of the activity and/or the time the content is to be served to the user, the determination of the location affinity may be based on the historical geographic locations. The determination of the location affinity may not be based on the current geographic location. For example, with regard to the accumulated data 122 of table 150 of FIG. 3, if the user is currently visiting "Site 1" from an access device while in Dallas, the location affinity rules 126 may be applied based on the accumulated location data 122 and may not take into consideration the user's current geographic location of Dallas. That is, the accumulated location data 122 may not include the user's current geographic location. Targeted content may be selected and delivered to the user based on historical geographic locations of the user, regardless of the current geographic location of the user. For example, if the user activity that is causing content to be delivered is the user is registering for "Site 1" while in Dallas, the current geographic location of Dallas may not be considered in the determination of location affinity. Thus, based on application of affinity rules 126 to accumulated location data 122 (not including the activity in the current geographic location of Dallas), the user associated with the used ID "1234" has a location affinity 310 with New York City based on satisfying at least rules 1, 3, 4 5 and 6, and does not have a location affinity 310 with Dallas.

In some embodiments, the location affinity is based on geographic locations visited by the user in the past (e.g., historical geographic locations of the user) and a current geographic location of the user. For example, where a user takes part in activity that causes content to be served to the user, and the user is located in a geographic location (e.g., a current geographic location) at the time of the activity and/or the time the content is to be served to the user, the determination of the location affinity may be based on the historical geographic locations and the current geographic location. For example, with regard to the accumulated data 122 of table 150 of FIG. 3, if the user is currently visiting "Site 1" from an access device while in Dallas, the location affinity rules 126 may be applied based on the accumulated location data 122 and may take into consideration the user's current geographic location of Dallas. That is, the accumulated location data 122 may include the user's current geographic location. Targeted content may be selected and delivered to the user based on historical geographic locations of the user and the current geographic location of the user. For example, if the user activity that is causing content to be delivered is the user is registering for "Site 1" while in Dallas, the current geographic location of Dallas may be considered in the determination of location affinity. Thus, based on application of affinity rules 126 to accumulated location data 122 (including the activity in the current geographic location of Dallas), the user associated with the used ID "1234" has a location affinity 310 with New York City based on satisfying at least rules 1, 3, 4 5 and 6, and a location affinity 310 with Dallas based on satisfying at least rule 4.

Method 300 may include identifying corresponding content 314, as depicted at block 316. Identifying corresponding content may include identifying content that corresponds to the results of the determination of whether or not a location affinity exists. For example, particular content (e.g., targeted content) may be identified where it is determined that a location affinity exists and other content (e.g., content not based on a location affinity) may be identified where it is determined that a location affinity does not exist. In some embodiments, the identified corresponding content 316 may include targeted content corresponding to one or more location affinities 310.

Where it is determined that one or more location affinities (e.g., location affinity 310) exists, identifying corresponding content may include identifying affinity content that corresponds to the one or more location affinity (e.g., corresponding content 314). For example, with regard to the accumulated data 122 of table 150 of FIG. 3, the application of the first rule of table 170 of FIG. 4 and the first content rule 128 of table 180 of FIG. 5, it may be determined that the user associated with user ID "1234" has a location affinity with New York City based on the satisfaction of the first rule and "Advertisement 1" may be identified as content corresponding to the location affinity based on application of the first of the affinity content rules 128.

As discussed above, based on application of affinity rules 126 to accumulated location data 122, it may be determined that the user associated with the used ID "1234" has a location affinity 310 with New York City based on the satisfaction of at least rules 1 and 3-6. Accordingly, based on affinity content rules 128, Advertisements 1 and 3-6 may be identified as corresponding content 310. In some embodiments, where multiple different types of content are identified as corresponding to the identified location affinities, all of the different types of content may be identified as corresponding content. For example, each of Advertisements 1 and 3-6 may be identified as corresponding content 310. In some embodiments, where multiple different types of content are identified as corresponding to the identified location affinities, less than all of the different types of content may be identified as corresponding content. For example, Advertisements 1 and 3-6 may be ranked in importance, and the higher ranked advertisements (e.g., Advertisement 6) may be identified as corresponding content 314. In some embodiments, the rules may be ranked in order of importance with the higher number rules being of higher importance. Thus, for example, upon determining that the user has a location affinity 310 with New York City based on the satisfaction of at least rules 1 and 3-6, advertisement 6 may be identified as the content corresponding to the location affinity 310. Accordingly, Advertisements 1-5 may not be identified as corresponding content 314.

Corresponding content 314 may correspond to a location affinity determined to exist. In some embodiments, corresponding content 314 includes content that is targeted to user's travel and activity patterns. Corresponding content 314 may have an association with the geographic location(s) and/or activity type/description corresponding to the location affinity. For example, where it has been determined that the user has a location affinity with New York City, Advertisements 1-6 may include advertisements for good and/or services expected to be available to the user while visiting New York City. For example, Advertisement 1 may include a coupon for $25 discount on a New York City hotel room which is expected to be useful to a person that visits New York frequently (e.g., more than three times per year). As a further example, advertisement 5 may include a coupon for a $10 discount on tickets to musical performed in New York City, where the tickets are offered for sale through the website.

In some embodiments, corresponding content 314 may not be targeted to a user's travel and activity patterns. Where it is determined that a location affinity does not exist, corresponding content 314 may include content that is not targeted to user's travel and activity patterns. For example, corresponding content 314 may include a generic webpage advertisement applicable to all products offered for sale on the website, and may not be targeted to products on the website associated with a given geographic location.

Method 300 may include receiving a request for content 318, as depicted at block 320. Receiving a request for content may include receiving, from a client computer system, a current request to provide content to the user. In the context of content system 100 (described with regard to at least FIG. 1), receiving a request for content may include content provider system 102 receiving, from access device 104, a transmission that causes content provider system to transmit content to access device 104. In some embodiments, the transmission may include a user initiated request to view a webpage via access device 104. In the context of content system 100' (described with regard to at least FIG. 6), receiving a request for content may include browser application 212 issuing a webpage request 222 to web content server 210a of content provider 202a via network 208 (e.g., via the Internet).

Method 300 may include providing content 322, as depicted at block 324. Providing content may include providing, to a client computer system in response to the current request, corresponding content 314. For example, where it is determined that the user has a location affinity New York City based on the first of location affinity rules 126 and "Advertisement 1" has been identified as corresponding content based on the first of affinity content rules 128, providing content may include providing the content of "Advertisement 1" for presentation to the user. In the context of content system 100 (described with regard to at least FIG. 1), providing content may include content provider system 102 transmitting content to access device 104 for presentation to user 108. For example, content provider system 102 may transmit a webpage including content that satisfies the user's request along with corresponding content 314 that includes a targeted webpage advertisement (e.g., Advertisement 1) such that the web page is displayed to user 108, along with the targeted webpage advertisement. In the context of content system 100' (described with regard to at least FIG. 6), providing content may include content provider 202a transmitting content 210 to browser application 212 of client device 104 for presentation to user 108. For example, in response to request 222, web content server 210a may transmit the corresponding content 210 (e.g., webpage HTML code 224 corresponding to webpage 212a and corresponding content 314 that includes a targeted webpage advertisement (e.g., Advertisement 1)) to browser application 212. Browser application 212 may interpret the received webpage code 224 to display the requested webpage 212a and targeted webpage advertisement to user 108 at a user interface (e.g., monitor) of client device 204 such that the web page 212a is displayed to user 108, along with the targeted webpage advertisement (e.g., Advertisement 1).

It will be appreciated that method 300 is an exemplary embodiment of a method employed in accordance with techniques described herein. Method 300 may be may be modified to facilitate variations of its implementations and uses. Method 300 may be implemented in software, hardware, or a combination thereof. Some or all of method 300 may be implemented by location affinity processing module 102. The order of method 300 may be changed, and various elements may be added, reordered, combined, omitted, modified, etc. For example, in some embodiments, the application of location affinity rules to the geographic location data to determine whether a location affinity exists (block 312) and/or identifying corresponding content (block 316) may be provided before or after receiving the request for content (block 320).

Exemplary Computer System

FIG. 9 is a diagram that illustrates an exemplary computer system 1000 in accordance with one or more embodiments of the present technique. Various portions of systems 100, 100', and/or 100" and/or methods 400 and/or 700 described herein, may be executed on one or more computer systems similar to that described herein, which may interact with various other devices of the system. For example, location affinity processing module 102 may be executed on a computer system of content provider system 102 (e.g., a computer system of web analytics provider 300, content providers 202a and/or 202b, or a standalone computer system). Device 104 and/or client device 204 may include a computer device similar to that of computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040. Program instructions may include instructions for implementing the techniques described with respect to method 300.

In some embodiments, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 106 and/or 208), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of a layout-preserved text generation method as described herein, and data storage 1035, comprising various data accessible by program instructions 1025. In one embodiment, program instructions 1025 may include software elements of a method illustrated in the above Figures. Data storage 1035 may include data that may be used in embodiments described herein. In other embodiments, other or different software elements and/or data may be included.

Those skilled in the art will appreciate that computer system 1000 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A method for providing targeted affinity content, the method comprising:
    obtaining historical geographic location data indicative of a geographic location visited by a user;
    identifying a location affinity associating the user with one or more of the geographic location visited by the user;
    obtaining historical network content interaction data identifying one or more network content sites visited by the user while visiting the geographic location;
    identifying targeted affinity content corresponding to the location affinity;
    receiving, from a client computer system, a current request for network content from a particular one of the identified network content sites; and
    providing, to the client computer system in response to the current request, both the requested network content from the particular identified network content site and the identified targeted affinity content.

2. The method of claim 1, wherein obtaining historical network content interaction data comprises, for each of a plurality of prior interactions of the user with a content site:
    receiving an identifier unique to the user;
    receiving a geographic location of the user at the time of the interaction; and
    correlating the geographic location of the user at the time of the interaction with the identifier.

3. The method of claim 1, wherein obtaining the historical geographic location data comprises receiving a log indicative of a plurality of geographic location visited by a user in the past.

4. The method of claim 1, wherein identifying the location affinity does not comprise considering a geographic location of the user at or near the time of the current request.

5. The method of claim 1, wherein identifying the location affinity comprises comparing the historical geographic location data to one or more predefined location affinity rules.

6. The method of claim 5, wherein the one or more predefined location affinity rules comprise at least one of the following: the location affinity is identified if the user has made a minimum number of visits to the geographical location, and the location affinity is identified if the historical network content interaction data includes a predetermined type of interaction.

7. The method of claim 5, further comprising identifying the location affinity based on at least one of the predefined location affinity rules being satisfied, wherein identifying the targeted affinity content comprises identifying content that corresponds to at least one of the predefined location affinity rules determined to have been satisfied.

8. The method of claim 1, wherein the targeted affinity content corresponds to the geographic locations of the location affinity.

9. The method of claim 1, wherein the targeted affinity content comprises an advertisement for a good or a service provided at or near the geographic location of the location affinity.

10. The method of claim 1, wherein the client computer system comprises a mobile electronic device.

11. The method of claim 10, wherein the mobile electronic device comprises a cellular communications device.

12. The method of claim 1, wherein the identified targeted affinity content is provided to the client computer system with the requested network content.

13. The method of claim 12, wherein the targeted affinity content is configured to be displayed in association with the requested network content.

14. The method of claim 1, wherein at least a portion of the historical geographic location data is obtained from the client computer device.

15. The method of claim 1, wherein the targeted affinity content is identified prior to the current request.

16. A non-transitory computer readable storage medium storing computer-executable program instructions that when executed by a computer are configured to cause:
    obtaining historical geographic location data indicative of a geographic location visited by a user;
    identifying a location affinity associating the user with one or more of the geographic location visited by the user;
    obtaining historical network content interaction data identifying one or more network content sites visited by the user while visiting the geographic location;
    identifying targeted affinity content corresponding to the location affinity;
    receiving a current request for network content from a particular one of the identified network content sites; and
    providing, in response to the current request, both the requested network content from the particular identified network content site and the identified targeted affinity content.

17. A content delivery system, comprising:
    a processor; and
    a memory storing a location affinity processing module executable by the processor to:
        obtain historical geographic location data indicative of a geographic location visited by a user;
        identify a location affinity associating the user with one or more of the geographic location visited by the user;

obtain historical network content interaction data identifying one or more network content sites visited by the user while visiting the geographic location;

identify targeted affinity content corresponding to the location affinity;

receive a current request for network content from a particular one of the identified network content sites; and provide, in response to the current request, both the requested network content from the particular identified network content site and the identified targeted affinity content.

* * * * *